US006775461B2

(12) United States Patent
Poslinski et al.

(10) Patent No.: US 6,775,461 B2
(45) Date of Patent: Aug. 10, 2004

(54) DATA MANAGEMENT METHOD FOR RECORDED PROGRAMS STORED ON A DIGITAL RECORDING DEVICE

(75) Inventors: Thomas Poslinski, San Diego, CA (US); Eric Hsiao, Carlsbad, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 10/272,177

(22) Filed: Oct. 15, 2002

(65) Prior Publication Data

US 2004/0071439 A1 Apr. 15, 2004

(51) Int. Cl.[7] .................................................. H04N 5/91
(52) U.S. Cl. ............................. 386/46; 386/83; 386/95; 386/124; 386/125
(58) Field of Search ..................... 386/46, 95, 83, 386/52, 55, 124, 125–126; H04N 5/91

(56) References Cited

U.S. PATENT DOCUMENTS

| | | | |
|---|---|---|---|
| 5,729,649 A | | 3/1998 | Lane et al. ..................... 386/68 |
| 6,147,823 A | | 11/2000 | Matsumi et al. ............... 360/8 |
| 6,260,170 B1 | | 7/2001 | Lee ............................ 714/769 |
| 6,311,011 B1 | * | 10/2001 | Kuroda ........................ 386/46 |
| 6,324,338 B1 | * | 11/2001 | Wood et al. .................. 386/83 |
| 6,389,223 B1 | * | 5/2002 | Aotake ....................... 386/109 |

FOREIGN PATENT DOCUMENTS

| | | | | |
|---|---|---|---|---|
| WO | Wo 92/22983 | * | 12/1993 | .................... 5/781 |

* cited by examiner

*Primary Examiner*—Vincent Boccio
(74) *Attorney, Agent, or Firm*—Wagner, Murabito & Hao LLP

(57) ABSTRACT

A data management method for recorded programs stored on a digital recording device. A portion of a first recorded program is rendered to an audio/video device. A user command is received for releasing memory associated with a rendered portion of the first recorded program. In response to the user command, the memory associated with the rendered portion is released, wherein the memory is available to store data associated with a second recorded program and a remaining portion of the first recorded program is available for presentation to the audio/video device. The present invention provides a method for maximizing the storage space of a digital recording device, such as a personal video recorder (PVR) or a digital video recorder (DVR), by allowing for partial deletion of a recorded program. The remaining portion of the recorded program may be presented in response to a second user command.

35 Claims, 4 Drawing Sheets

400

```
┌─────────────────────────────────────────────────┐
│ RENDER A PORTION OF A FIRST RECORDED PROGRAM    │
│ STORED AS AN MPEG VIDEO STREAM TO AN            │
│ AUDIO/VIDEO DEVICE                              │
│ 410                                             │
└─────────────────────────────────────────────────┘
                        │
                        ▼
┌─────────────────────────────────────────────────┐
│ RECEIVE A USER COMMAND FOR RELEASING MEMORY     │
│ ASSOCIATED WITH THE PORTION                     │
│ 420                                             │
└─────────────────────────────────────────────────┘
                        │
                        ▼
┌─────────────────────────────────────────────────┐
│ IN RESPONSE TO THE USER COMMAND, CONCATENATING  │
│ THE FIRST RECORDED PROGRAM AT AN INTRA FRAME    │
│ OF THE MPEG VIDEO STREAM                        │
│ 430                                             │
└─────────────────────────────────────────────────┘
                        │
                        ▼
┌─────────────────────────────────────────────────┐
│ RELEASING THE PORTION OF THE FIRST RECORDED     │
│ PROGRAM PRIOR TO THE INTRA FRAME                │
│ 440                                             │
└─────────────────────────────────────────────────┘
                        │
                        ▼
┌─────────────────────────────────────────────────┐
│ RECEIVE A SECOND USER COMMAND FOR RENDERING     │
│ THE REMAINING PORTION OF THE FIRST RECORDED     │
│ PROGRAM                                         │
│ 450                                             │
└─────────────────────────────────────────────────┘
                        │
                        ▼
┌─────────────────────────────────────────────────┐
│ SYNCHRONIZE AUDIO AND VIDEO OF THE REMAINING    │
│ PORTION ACCORDING TO A PRESENTATION TIME STAMP  │
│ OF THE MPEG VIDEO STREAM                        │
│ 460                                             │
└─────────────────────────────────────────────────┘
                        │
                        ▼
┌─────────────────────────────────────────────────┐
│ RENDER THE REMAINING PORTION OF THE FIRST       │
│ RECORDED PROGRAM TO THE AUDIO/VIDEO DEVICE      │
│ 470                                             │
└─────────────────────────────────────────────────┘
```

FIGURE 4

DATA MANAGEMENT METHOD FOR RECORDED PROGRAMS STORED ON A DIGITAL RECORDING DEVICE

FIELD OF INVENTION

The present invention relates to the field of video presentation. In particular, the present invention relates to a method for partial deletion of a recorded program stored on a digital recording device.

BACKGROUND OF THE INVENTION

Since the advent of analog video recording devices, such as video cassette recorders (VCR), people have recorded television programs for viewing at a later time. Recent technological advances have led to the creation of digital video recording devices, such as personal video recorders (PVR) and digital video recorders (DVR). PVRs and DVRs provide similar recording functionality to traditional VCRs; however, digital recording devices provide a number of features and enhancements not available on VCRs.

One improvement available in PVRs and DVRs is that recorded television programs are stored digitally on an internal storage device (e.g., a hard disk drive). A user can program the device to record a television program to the hard drive for viewing at a later time. Often, a user can subscribe to service that provides downloadable channel guides that can be used to record every instance of selected television programs whenever they are broadcast. Due to the amount of programming available to the typical user, often hundreds of channels, and the finite amount of storage space of a PVR or DVR, it is common for a user to fill the storage space of the hard drive. When the storage space is filled, no more television programs can be recorded.

Once a user has viewed a program, the user has the option of deleting the entire television program. Deleting a television program releases the storage space used to store the television program, allowing the recording of other television programs. However, a user may not have enough time to view the entire recorded program, so the user does not delete the television program, saving it so that the remaining portion can be viewed at a later time.

Currently, only an entire television program can be deleted from a PVR or DVR. Due to the viewing habits of many users, it is possible that the storage space of a PVR or DVR may be full while a number of the recorded television programs have been partially viewed. However, since only entire recorded television programs can be deleted from the device, the storage space used by previously viewed portions of recorded television programs cannot be used to record additional television programs.

SUMMARY OF THE INVENTION

Accordingly, a need exists for a method and/or device that provides for efficient use of the storage space of a digital video recording device. Furthermore, a need exists for a method and/or device that satisfies the above need by allowing for deleting viewed portions of recorded television programs. A need also exists for a method and/or device that satisfies the above needs, and is easily integrated into commercially available digital video recording devices.

A data management method for recorded programs stored on a digital recording device, in accordance with various embodiments of the present invention, is presented. In one embodiment, the digital recording device is a personal video recorder (PVR). In another embodiment, the digital recording device is a digital video recorder (DVR).

A portion of a first recorded program is rendered to an audio/video device. In one embodiment, the first recorded program is a recorded television program. In one embodiment, the audio/video device is a television. In one embodiment, the first recorded program is stored within a hard drive of the digital recording device or another suitable digital recording medium. In one embodiment, the first recorded program is stored as a Moving Pictures Expert Group (MPEG) video stream.

A user command is received, wherein the user command is for releasing memory associated with the rendered portion of the first recorded program. In response to the user command, the memory associated with the rendered portion of the program is released, wherein the memory is available to store data associated with a second recorded program and subsequently a remaining portion of the first recorded program is maintained in memory and thereby available for presentation to the audio/video device. In one embodiment, where the first recorded program is stored as an MPEG video stream, the first recorded program is concatenated at an Intra frame of the MPEG video stream. The portion of the first recorded program prior to the Intra frame is released.

In one embodiment, a second user command is received, wherein the second user command is for presenting the remaining portion of the first recorded program. Where the first recorded program is stored as an MPEG video stream, audio and video of the MPEG video stream are synchronized according to a presentation time stamp of the MPEG video stream. The remaining portion of the first recorded program is rendered to the audio/video device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flowchart diagram illustrating steps in a process for partial deletion of recorded programs stored as MPEG video streams on a digital video recording device in accordance with one embodiment of the present invention.

DETAILED DESCRIPTION

Figure 1:
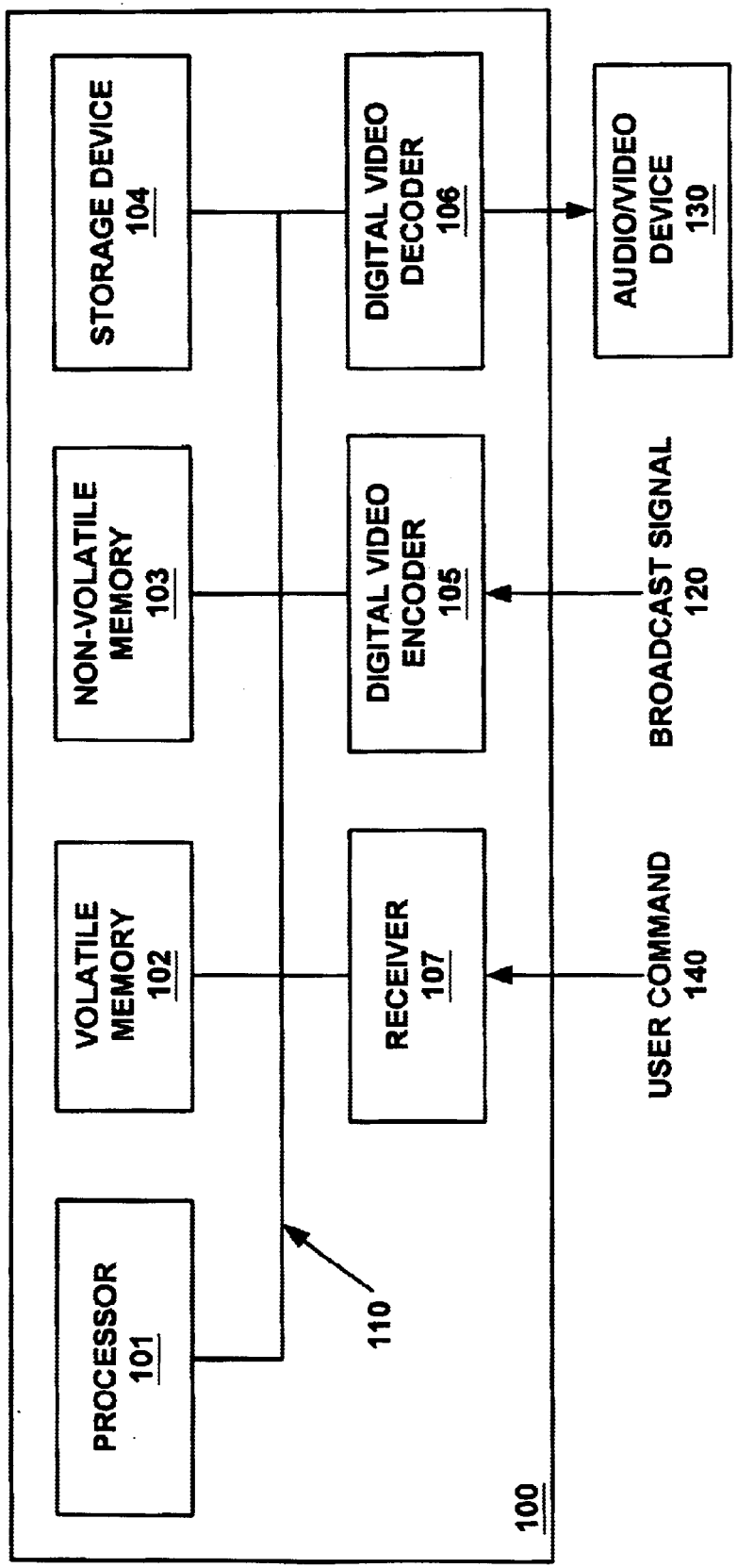
FIG. 1 is a block diagram of an exemplary digital video recording device upon which embodiments of the present invention may be practiced.

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering," "receiving," "releasing," "concatenating," "synchronizing," "reading," "displaying," "reallocating" or the like, refer to actions and processes (e.g., processes 200 and 400 of FIGS. 2 and 4, respectively) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

Refer now to FIG. 1, which illustrates an exemplary computer controlled digital video recording device 100 upon which embodiments of the present invention may be practiced. In one embodiment, digital video recording device 100 is a personal video recorder (PVR). In another embodiment, digital video recording device 100 is a digital video recorder (DVR). It should be appreciated that digital video recording device 100 may be any electronic device for use in recording and playing recorded programs, and is not intended to be limited to PVRs and DVRs.

In one embodiment, digital video recording device 100 comprises bus 110 for communicating information, processor 101 coupled with bus 110 for processing information and instructions, volatile memory 102 (e.g., random access memory, static RAM, dynamic, RAM, etc.) coupled with bus 110 for storing information and instructions for processor 101, non-volatile memory 103 (e.g., read only memory, programmable ROM, flash memory, EPROM, EEPROM, etc.) coupled with bus 110 for storing static information and instructions for processor 101, and data storage device 104 coupled with bus 110 for storing data. It should be appreciated that data storage device 104 can be any storage medium for storing digital data, such as a magnetic or optical disk and disk drive. Furthermore, data storage device 104 can have any amount of storage space.

Broadcast signal 120 transmits programs to digital video recording device 100. In one embodiment, broadcast signal 120 is received over a cable from a cable television provider. In another embodiment, broadcast signal 120 is received from a satellite broadcast by a satellite television provider. In another embodiment, broadcast signal 120 is transmitted over the airways from a broadcast tower by a television broadcaster (e.g., a television station). It should be appreciated that broadcast signal 120 can be any signal for rendering on an audio/video device, and is not intended to be limited by the aforementioned embodiments.

Broadcast signal 120 may be received in either analog or digital format. Where broadcast signal 120 is an analog signal, the analog signal is converted to a digital signal. In one embodiment, digital video recording device 100 also comprises digital video encoder 105. Digital video encoder 105 is configured to receive broadcast signal 120 and digitize an analog signal into a digital format for storage.

In one embodiment, data storage device 104 stores (e.g., records) a program transmitted over broadcast signal 120 in a digital format. In one embodiment, the recorded programs are television programs. In one embodiment, recorded programs are stored on data storage device 104 as Moving Pictures Expert Group (MPEG) video streams. It should be appreciated that the number and length of programs that can be stored (e.g., recorded) onto data storage device 104 depends on the size of data storage device 104.

Digital video recording device 100 also comprises digital video decoder 106. Digital video decoder 106 receives a recorded program in a digital format and decodes the signal for rendering on audio/video device 130. In one embodiment, audio/video device 130 is a television. In one embodiment, digital video decoder receives and decodes a recorded program stored in a digital format on storage device 104.

In one embodiment, digital video recording device 100 comprises receiver 107 for receiving user command 140. In one embodiment, a user transmits user command 140 by interacting with a remote control communicatively coupled to receiver 107 by a wireless connection. It should be appreciated that user command 140 may be received in response to interaction with a graphical user interface rendered on audio/video device 130. User command 140 directs digital video recording device 100 to perform a specific function. For example, user command 140 may direct digital video recording device 100 to record a television program (e.g., store a television in a digital format on storage device 104). User command 140 may direct digital video recording device 100 to play (e.g., render) a previously recorded television program.

In one embodiment, digital video recording device 100 provides for partial deletion of a recorded program stored on storage device 104. In response to a user command, a recorded program is rendered to audio/video device 130. The rendering of the recorded program is stopped in response to another user command. In response to a particular user command, the viewed portion of the recorded program is released from storage device 104. By releasing the rendered portion from storage device 104, the storage space (e.g., hard disk drive) associated with the rendered portion is available to store data associated with another recorded program. Furthermore, the remaining portion of the recorded program is available for presentation to the audio/video device.

Figure 2:
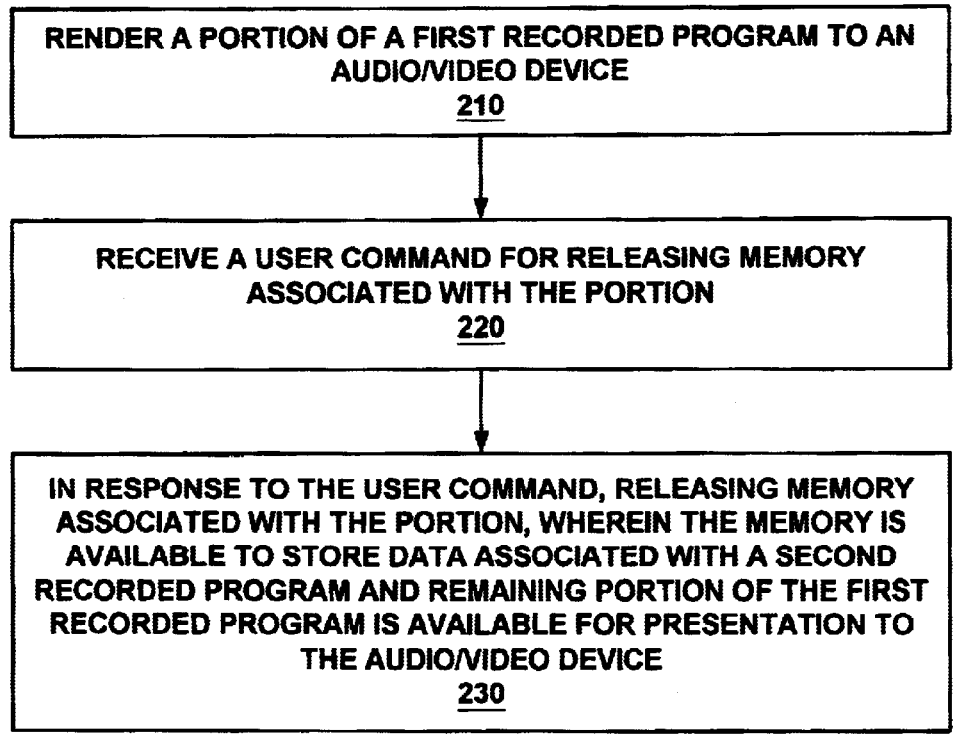
FIG. 2 is a flowchart diagram illustrating steps in a process for partial deletion of recorded programs stored on a digital video recording device in accordance with one embodiment of the present invention.

FIG. 2 is a flowchart diagram illustrating steps in a computer controlled process 200 for partial deletion of recorded programs stored on a digital video recording device in accordance with one embodiment of the present invention. Although specific steps are disclosed in process 200, such steps are exemplary. That is, the embodiments of the present invention are well suited to performing various other steps or variations of the steps recited in FIG. 2. As depicted in FIG. 2, process 200 diagrams the process for partial deletion of a recorded program stored on a digital video recording device, for example, digital video recording device 100 of FIG. 1.

At step 210 of process 200, a portion of a first recorded program is rendered to an audio/video device. In one embodiment, the first recorded program is a television program stored on a hard drive (e.g., storage device 104 of FIG. 1) of a digital video recording device. In one embodiment, the portion of the first recorded program is rendered in response to a user command. For example, a user selects the first recorded program for playback using the digital video recording device. The first recorded program is then rendered to an audio/video device (e.g., a television).

Figure 3:
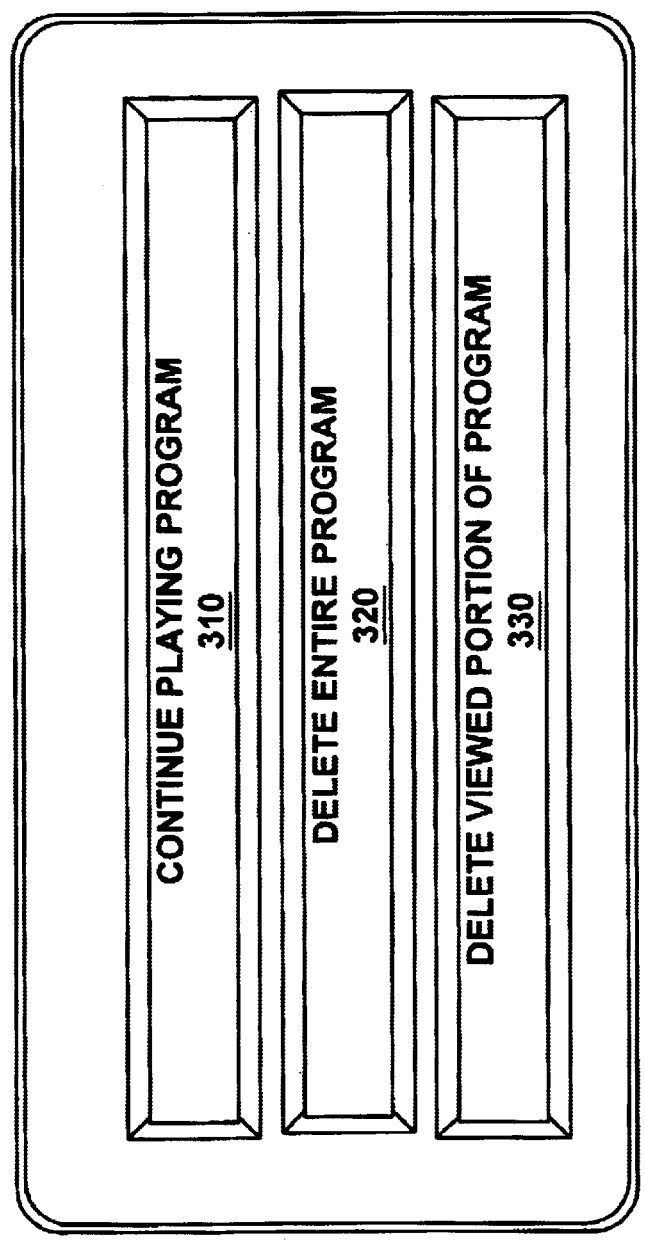
FIG. 3 is an exemplary graphical user interface for activating a process for partial deletion of recorded programs stored on a digital video recording device in accordance with one embodiment of the present invention.

At step 220, a user command is received for releasing memory associated with rendered portion of the first recorded program. In one embodiment, a user interacts with the digital video recording device to stop playback of the first recorded program. A graphical user interface is displayed on the audio/video device comprising at least one user selection. FIG. 3 is an exemplary graphical user interface 300 for activating a process for partial deletion of recorded programs stored on a digital video recording device in accordance with one embodiment of the present invention.

In one embodiment, graphical user interface 300 is rendered on a display of an audio/video device. By interacting with graphical user interface 300, for example by using a remote control, a user can select a user selection. Graphical user interface 300 is rendered in response to a user stopping playback of a recorded program. User selection 310 provides for a user to continue playback of the recorded program. User selection 320 provides for a user to delete the entire recorded program. User selection 330 provides for a user to delete the viewed portion of the recorded program.

With reference to FIG. 2, at step 230, in response to the user command, the memory associated with the rendered portion is released. Releasing the memory allows for the memory to be available to store data associated with a second recorded program. Furthermore, the remaining portion of the first recorded program is not deleted, and thus is available for presentation to the audio/video device.

FIG. 4 is a flowchart diagram illustrating steps in a computer controlled process 400 for partial deletion of recorded programs stored as MPEG video streams on a digital video recording device in accordance with one embodiment of the present invention. Although specific steps are disclosed in process 400, such steps are exemplary. That is, the embodiments of the present invention are well suited to performing various other steps or variations of the steps recited in FIG. 4. As depicted in FIG. 4, process 400 diagrams the process for partial deletion of a recorded program stored on a digital video recording device, for example, digital video recording device 100 of FIG. 1.

At step 410 of process 400, a portion of a first recorded program stored as an MPEG video stream is rendered to an audio/video device. In one embodiment, the first recorded program is a television program stored on a hard drive (e.g., storage device 104 of FIG. 1) of a digital video recording device. In one embodiment, the portion of the first recorded program is rendered in response to a user command. For example, a user selects the first recorded program for playback using the digital video recording device. The first recorded program is then rendered to an audio/video device (e.g., a television).

At step 420, a user command is received for releasing memory associated with rendered portion of the first recorded program. In one embodiment, a user interacts with the digital video recording device to stop playback of the first recorded program. A graphical user interface (e.g., graphical user interface 300 of FIG. 3) is displayed on the audio/video device comprising at least one user selection. One user selection provides for a user to delete the viewed portion of the first recorded program.

At step 430, in response to the user command, the first recorded program is concatenated at an Intra frame of said MPEG video stream. An MPEG video stream comprises both video and audio components. The video component comprises Intra frames (I frames), predicted frames (P frames), and bi-directional frames (B frames). In general, I frames comprise the information in the picture itself, such as a JPEG image. Following I frames will be one or more P frames. The P frame comprises information based only the differences between the P frame and the I frame it is based on. Between I and P frames are B frames which are based on the nearest I or P frames both before and after them. Because an Intra frame comprises information for a complete image, the MPEG video stream for the first recorded program is concatenated at an Intra frame. In one embodiment, the first recorded program is concatenated before the last I frame rendered prior to stopping the MPEG video stream.

At step 440, memory (e.g., storage) associated with the rendered portion is released prior to the last I frame rendered prior to stopping the MPEG video stream. Using the last Intra frame, a byte offset can be calculated to that point in the digital file (e.g., the first recorded program). The number of bytes calculated by the byte offset is deleted from the first recorded program. The total number of bytes of the program prior to the deletion minus the byte offset represents the remaining portion of the first recorded program. The number of seconds remaining in the first recorded program can be calculate based on the last I frame rendered. It should be appreciated that any reference files associated with the first recorded program that are required for playback are truncated at the same proportions as the first recorded program.

Releasing the memory allows for the memory to be available to store data associated with a second recorded program. Furthermore, the remaining portion of the first recorded program is not deleted, and thus is available for presentation to the audio/video device.

Steps 450–470 of process 400 illustrate steps in a process for playback of a first recorded program once a portion of the first recorded program has been deleted in accordance with one embodiment of the present invention. It should be appreciated that steps 450–470 are optional, and that steps 410–440 can operate independently of steps 450–470 in embodiments of the present invention.

At step 450 a second user command is received, wherein the second user command is for presenting the remaining portion of the first recorded program. In one embodiment, the remaining portion of the first recorded program is accessed from a storage device of the digital video recording device (e.g., storage device 104 of FIG. 1).

At step 460, the audio and video components of the MPEG video stream are synchronized according to a presentation time stamp (PTS) of the MPEG video stream. In one embodiment, the MPEG video stream comprises at least one PTS that indicates the exact moment where a video frame or an audio frame has to be decoded or rendered, respectively.

At step 470, the remaining portion of the first recorded program is rendered to the audio/video device. In one embodiment, the remaining portion of the first recorded program is rendered to an audio/video device (e.g., a television). Playback is resumed from the first I frame remaining in the first recorded program. It should be appreciated that playback control operations (e.g., pause, fast forward and reverse user commands) are available for the remaining portion of the first recorded program.

The preferred embodiment of the present invention, a data management method for recorded programs stored on a digital recording device, is thus described. While the present invention has been described in particular embodiments, it should be appreciated that the present invention should not be construed as limited by such embodiments, but rather construed according to the below claims.

What is claimed is:

1. A data management method for recorded programs stored on a digital recording device, said method comprising:
    rendering a portion of a first recorded program to an audio/video device;
    receiving a user command for releasing memory associated with said portion of said first recorded program; and
    in response to said user command, releasing said memory associated with said portion, wherein said memory is available to store data associated with a second recorded program and a remaining portion of said first recorded program is available for presentation to said audio/video device.

2. The method as recited in claim 1 wherein said first recorded program is a recorded television program.

3. The method as recited in claim 1 wherein said first recorded program is stored within a hard drive of said digital recording device.

4. The method as recited in claim 1 wherein said first recorded program is stored as a video stream in a format that is substantially compliant with the Moving Pictures Expert Group (MPEG).

5. The method as recited in claim 4 wherein said releasing said memory associated with said portion comprises:
    concatenating said first recorded program at an Intra frame of said MPEG video stream; and
    releasing said portion of said first recorded program prior to said Intra frame.

6. The method as recited in claim 5 further comprising:
    receiving a second user command for presenting said remaining portion of said first recorded program;
    synchronizing audio and video of said MPEG video stream according to a presentation time stamp of said MPEG video stream; and
    rendering said remaining portion of said first recorded program to said audio/video device.

7. The method as recited in claim 1 wherein said digital recording device is a personal video recorder (PVR).

8. The method as recited in claim 1 wherein said digital recording device is a digital video recorder (DVR).

9. The method as recited in claim 1 wherein said audio/video device is a television.

10. An electronic device comprising:
    a processor;
    a memory unit coupled to said processor;
    a storage device coupled to said processor and for storing a recorded program;
    a receiver coupled to said processor and for receiving a user command; and
    a video decoder coupled to said processor and for decoding said recorded program and for presenting said recorded program on a display device;
    said memory unit having computer-readable program code embodied therein for causing said processor to perform a method for partial deletion of said recorded program, said method comprising:
        playing a portion of said recorded program;
        receiving a user command at said receiver, said user command for releasing storage space of said storage device associated with said portion of said recorded program; and
        in response to said user command, releasing said storage space associated with said portion, wherein said storage space is available to store data associated with another recorded program and a remaining portion of said recorded program is available for playback.

11. The electronic device as recited in claim 10 wherein said recorded program is a recorded television program.

12. The electronic device as recited in claim 10 wherein said electronic device is a digital recording device.

13. The electronic device as recited in claim 10 wherein said recorded program is stored as a video stream in a format that is substantially compliant with the Moving Pictures Expert Group (MPEG).

14. The electronic device as recited in claim 13 wherein said releasing said memory associated with said portion comprises:
    concatenating said recorded program at an Intra frame of said MPEG video stream; and
    releasing said portion of said recorded program prior to said Intra frame.

15. The electronic device as recited in claim 14 wherein said method further comprises:
    receiving a second user command for presenting said remaining portion of said recorded program;
    synchronizing audio and video of said MPEG video stream according to a presentation time stamp of said MPEG video stream; and
    presenting said remaining portion of said recorded program.

16. The electronic device as recited in claim 12 wherein said digital recording device is a personal video recorder (PVR).

17. The electronic device as recited in claim 12 wherein said digital recording device is a digital video recorder (DVR).

18. A computer-usable medium having computer-readable program code embodied therein for causing a computer system to perform a data management method for recorded programs stored on a digital recording device, said method comprising:
    rendering a portion of a first recorded program to an audio/video device;
    receiving a user command for releasing memory associated with said portion of said first recorded program; and in response to said user command, releasing said memory associated with said portion, wherein said memory is available to store data associated with second recorded program and a remaining portion of said first recorded program is available for presentation to said audio/video device.

19. The computer-usable medium as recited in claim 18 wherein said first recorded program is a recorded television program.

20. The computer-usable medium as recited in claim 18 wherein said first recorded program is stored within a hard drive of said digital recording device.

21. The computer-usable medium as recited in claim 18 wherein said first recorded program is stored as a video stream in a format that is substantially compliant with the Moving Pictures Expert Group (MPEG).

22. The computer-usable medium as recited in claim 21 wherein said releasing said memory associated with said portion comprises:

concatenating said first recorded program at an Intra frame of said MPEG video stream; and releasing said portion of said first recorded program prior to said Intra frame.

23. The computer-usable medium as recited in claim 22 further comprising:

receiving a second user command for presenting said remaining portion of said first recorded program;

synchronizing audio and video of said MPEG video stream according to a presentation time stamp of said MPEG video stream; and presenting said remaining portion of said first recorded program.

24. The computer-usable medium as recited in claim 18 wherein said digital recording device is a personal video recorder (PVR).

25. The computer-usable medium as recited in claim 18 wherein said digital recording device is a digital video recorder (DVR).

26. The computer-usable medium as recited in claim 18 wherein said audio/video device is a television.

27. A method of managing recorded media comprising:

reading a first portion of a recorded program from a digital medium for playback to an audio/visual device;

displaying a user interface comprising a user selection on said audio/visual device;

in response to a user command, reallocating said first portion for use in storing another recorded program thereon; and reading a remaining portion of said recorded program for playback to said audio/visual device.

28. The method as recited in claim 27 wherein said recorded program is a recorded television program.

29. The method as recited in claim 27 wherein said digital medium is a hard drive of a digital recording device.

30. The method as recited in claim 27 wherein said recorded program is stored as a video stream in a format that is substantially compliant with the Moving Pictures Expert Group (MPEG).

31. The method as recited in claim 30 wherein said reallocating said first portion comprises:

concatenating said recorded program at an Intra frame of said MPEG video stream; and reallocating said first portion prior to said Intra frame.

32. The method as recited in claim 30 wherein said reading a remaining portion of said recorded program comprises:

receiving a second user command for presenting said remaining portion of said recorded program;

synchronizing audio and video of said MPEG video stream according to a presentation time stamp of said MPEG video stream; and reading said remaining portion for playback to said audio/video device.

33. The method as recited in claim 27 wherein said digital recording device is a personal video recorder (PVR).

34. The method as recited in claim 27 wherein said digital recording device is a digital video recorder (DVR).

35. The method as recited in claim 27 wherein said audio/video device is a television.

* * * * *